(12) United States Patent
Detzler

(10) Patent No.: US 7,099,110 B2
(45) Date of Patent: Aug. 29, 2006

(54) DEAD ON DEMAND DISK TECHNOLOGY

(75) Inventor: Roger Detzler, Exeter, NH (US)

(73) Assignee: Ensconce Data Technology, Portsmouth, NH (US)

( * ) Notice: Subject to any disclaimer, the term of this patent is extended or adjusted under 35 U.S.C. 154(b) by 0 days.

(21) Appl. No.: 10/803,552

(22) Filed: Mar. 18, 2004

(65) Prior Publication Data
US 2004/0252628 A1 Dec. 16, 2004

Related U.S. Application Data

(60) Provisional application No. 60/455,501, filed on Mar. 18, 2003.

(51) Int. Cl.
G11B 33/14 (2006.01)
(52) U.S. Cl. .................... 360/97.02; 720/648
(58) Field of Classification Search ........... 720/718, 720/719, 748; 360/66, 69, 97.02, 137; 713/200, 713/201, 202; 428/64.1, 64.2, 64.4; 369/288, 369/275.5, 286
See application file for complete search history.

(56) References Cited

U.S. PATENT DOCUMENTS

| | | | | |
|---|---|---|---|---|
| 4,325,089 A | * | 4/1982 | Hsu | 360/15 |
| 4,842,217 A | * | 6/1989 | Vinson | 242/343 |
| 5,786,773 A | * | 7/1998 | Murphy | 340/947 |
| 5,815,484 A | | 9/1998 | Smith et al. | 369/275.1 |
| 6,228,440 B1 | * | 5/2001 | Dailey et al. | 428/1.1 |
| 6,338,933 B1 | | 1/2002 | Lawandy et al. | 430/270.1 |
| 6,343,063 B1 | * | 1/2002 | Rollhaus et al. | 369/286 |
| 6,434,109 B1 | * | 8/2002 | Rollhaus et al. | 369/286 |
| 6,468,619 B1 | * | 10/2002 | Larroche | 428/64.1 |
| 6,531,262 B1 | | 3/2003 | Lawandy et al. | 430/270.15 |
| 2002/0002685 A1 | * | 1/2002 | Shim | 713/200 |
| 2002/0129152 A1 | * | 9/2002 | McBrearty et al. | 709/229 |
| 2003/0131255 A1 | * | 7/2003 | Shim | 713/200 |
| 2004/0103302 A1 | * | 5/2004 | Yoshimura et al. | 713/200 |

FOREIGN PATENT DOCUMENTS

| | | | | |
|---|---|---|---|---|
| DE | 3704113 A | * | 8/1988 | |
| DE | 3839108 A | * | 6/1989 | |
| EP | 362463 A1 | * | 4/1990 | |
| FR | 2710179 A1 | * | 3/1995 | |
| JP | 01053352 A | * | 3/1989 | |
| JP | 01213834 A | * | 8/1989 | |
| JP | 09097432 A | * | 4/1997 | |
| JP | 10214424 A | * | 8/1998 | |

OTHER PUBLICATIONS

"Self-Destructing Diskette," Jun. 1, 1990, IBM Techincal Disclosure Bulletin, vol. No. 33, Iss. No. 1A, pp. 218-219.*

* cited by examiner

Primary Examiner—William J Klimowicz
(74) Attorney, Agent, or Firm—Dickstein Shapiro, LLP

(57) ABSTRACT

The present invention relates to a system and method for permanently and generally instantaneously destroying at least the data contained on magnetic data storage media upon the occurrence of certain events. Unauthorized access to data stored on magnetic media is prevented by destruction of the media with a reactant chemical. This approach may be initiated as a response to tampering or intentionally by using any one of several triggering interfaces described herein. Destruction of the media is quick and permanent, rendering the data unrecoverable even to aggressive recovery procedures.

10 Claims, 2 Drawing Sheets

DEAD ON DEMAND DISK TECHNOLOGY

CROSS-REFERENCE TO RELATED APPLICATION

This application claims priority from pending U.S. Provisional Patent Application No. 60/455,501, filed on Mar. 18, 2003 and incorporated fully herein by reference.

TECHNICAL FIELD OF THE INVENTION

The present invention relates to computer security, data security, and protection of personal privacy, and more particularly, to a system and method for permanently and generally instantaneously destroying data contained upon magnetic data storage media upon the occurrence of certain events and/or the desire of the media owner/attendant operator.

DESCRIPTION OF THE RELATED ART

Starting with the highly publicized Y2K event, computer systems have fallen under more and more scrutiny for their ability to securely store business critical and confidential data. The intervening years have seen a dramatic rise in 'computer terrorism' in the form of virus attacks and hacking. Software vendors are reeling in the wake of products that are repeatedly shown to be flawed at the security level, allowing information to be accessed, destroyed or published openly. The fastest growing crime in the United States is now 'identity theft'. Virtually unheard of 5 years ago, this 'technical' crime relies on the easy access of information such as social security numbers, credit card numbers, bank statements, etc. on a computer's hard drive.

With personal computers now reaching near saturation levels, much of this type of information is now stored in personal computers, which offer little or no protection of this data. In addition, the proliferation of digital devices such as cameras, and digital communication such as email, mean that more and more personal information, as well as accounting information is now stored on the average home computer. So prevalent is digital storage that virtually every search warrant executed now results in the removal of all personal computers from the target residence or business. In most cases with little or no effort, this information becomes available to law enforcement or worse, to a party with criminal intent.

In many cases, users of personal computer may have no idea of the data that is contained on their hard drive. Because of caching programs and use of 'cookies', it is possible that pieces of various web pages, including unintended popup-ads, etc. may be stored in 'temporary' areas. Users have little control over this data and it may contain text and images that do not pertain to their normal use of the Internet. Under legal scrutiny such materials may be potentially damaging.

In a recent Massachusetts Institute of Technology study, several hundred computers were recovered from a PC recycling center. The hard drives were removed and with very few exceptions students were able to retrieve private and confidential data about the previous owners.

Businesses have recognized the importance of data security for many years but recognition of the problem has not resulted in many viable solutions for keeping data away from intruders. Currently, businesses protect data using 'firewall' technology and internal security profiles which act as electronic gatekeepers, insuring that only authorized parties have access to specific information. If employed correctly, such technology can be effective but it is rarely employed correctly. On a daily basis, newspapers run stories of information being stolen, published or destroyed. In some cases the perpetrator is external but it is just as often an existing employee.

Governments and military organizations should have the greatest need for data security, yet they appear to be no better, or possibly worse, prepared than corporations. The recent story of missing notebook computers from top secret facilities indicates that these organizations suffer many of the same problems as corporations, only with data involving national security. Although the existence of leading edge 'secret' technology is a possibility at certain governmental levels and installations, for the most part the vast majority of governmental data is stored on the same type of systems used by major corporations.

The developmental focus of computer manufacturers has been performance and reliability. Computers are quantum levels faster and more reliable than ever before. Recently, the focus has started to shift toward security, mostly due to the advancement of the Internet and the rise it has given to virus attacks and hacking. The result of these efforts, as pertains to the problem described herein, is mainly encryption and various means for deleting data so that it cannot be recovered. However, both of these approaches are flawed.

Although encryption is a highly touted data security technology, it is not approachable by the average computer user. Second, there is no known 'unbreakable encryption'. The encryption offered by Microsoft can be broken at will by the United States government as Microsoft provided the government with a master key. Other forms of commercial encryption, such as DVD encoding, have been cracked with little or no problem by the hacker community. Lastly, commercial and private use of encryption, especially those above 128 bits, or where the government has not been provided keys, is under scrutiny by the United States government and may be made illegal under the Patriot Act. Levels below 128 bits are generally considered 'breakable' by the hacker community.

Another recent invention is the development of 'data eraser' software, which is intended to make deleted files 'unrecoverable' as well as eliminate the extraneous data that is created and stored by many applications, especially those involving the Internet. The efficacy of these products vary, and although some are capable of removing specific files to a point that they cannot be recovered, most are cumbersome and time consuming to use for the average computer user. Moreover, such programs must first be initiated (time does not always permit initiation and the computer may not remember to initiate the program) and secondly, the program must have time to run and perform its functions.

Accordingly, what is needed is a device and method for quickly destroying, generally instantaneously and without significant user intervention, data contained on a storage medium, such as a hard drive, upon command or some pre-determined trigger event. Thus, there is a need for an inexpensive, efficient, and effective device and method for permanent and irretrievable data destruction of a magnetic data storage device.

SUMMARY OF THE INVENTION

The present invention is a novel method and system for destroying data on a magnetic storage medium, such as a hard drive. At least the data contained on a storage media is destroyed upon the occurrence of certain events that are either initiated by an operator or automatically initiated or triggered without operator intervention, all generally referred to as an event. Upon the occurrence of an event, an activation device coupled to a reactant reservoir causes a reactant chemical to be distributed onto the magnetic data storage media, thereby destroying at least the stored data and perhaps the media as well. The reactant should cause a meaningful reaction with at least a significant portion of the surface area of the data storage media to an extent that the data storage area on the storage medium, typically a magnetic region or layer, is affected causing all or at least enough data stored on the data storage device to become irretrievable, thereby preventing files and data from being retrieved and/or reconstructed.

BRIEF DESCRIPTION OF THE DRAWINGS

These and other features and advantages of the present invention will be better understood by reading the following detailed description, taken together with the drawings wherein.

DETAILED DESCRIPTION OF THE INVENTION

The present invention utilizes the inventor's termed "Dead On Demand" (DOD) technology to completely eliminate the possibility of data recovery. It is the absolute last word and only permanent line of defense. It is instantaneous to use, can be invoked from practically anywhere and works in seconds. There is never a need to upgrade software, and it will work even if a PC or other device containing a storage medium is turned off at the time. Its compelling advantage is that when used, absolutely nothing can ever be recovered from the hard drive or other storage media.

DOD technology is the ultimate solution in data security because it offers the one option that no other storage product does, which is the total physical destruction of the hard drive unit itself. Although this form of data protection is severe, in certain situations there is no other option. A few situations where there is no other option for COMPLETE data protection include: 1) an attempt to steal corporate or government secrets by a hostile force; 2) an attempt to collect personal information about a computer user and his or her activities either by another family member, criminal, or law enforcement agency; 3) an intrusion response if a user's credentials are not submitted within "X" attempts; 4) an intrusion response to improperly dismantling a stolen PC; 5) an intrusion response when the DOD protected device is being removed or moved without proper authority; and 6) prior to the normal disposal of the PC.

Figure 1:
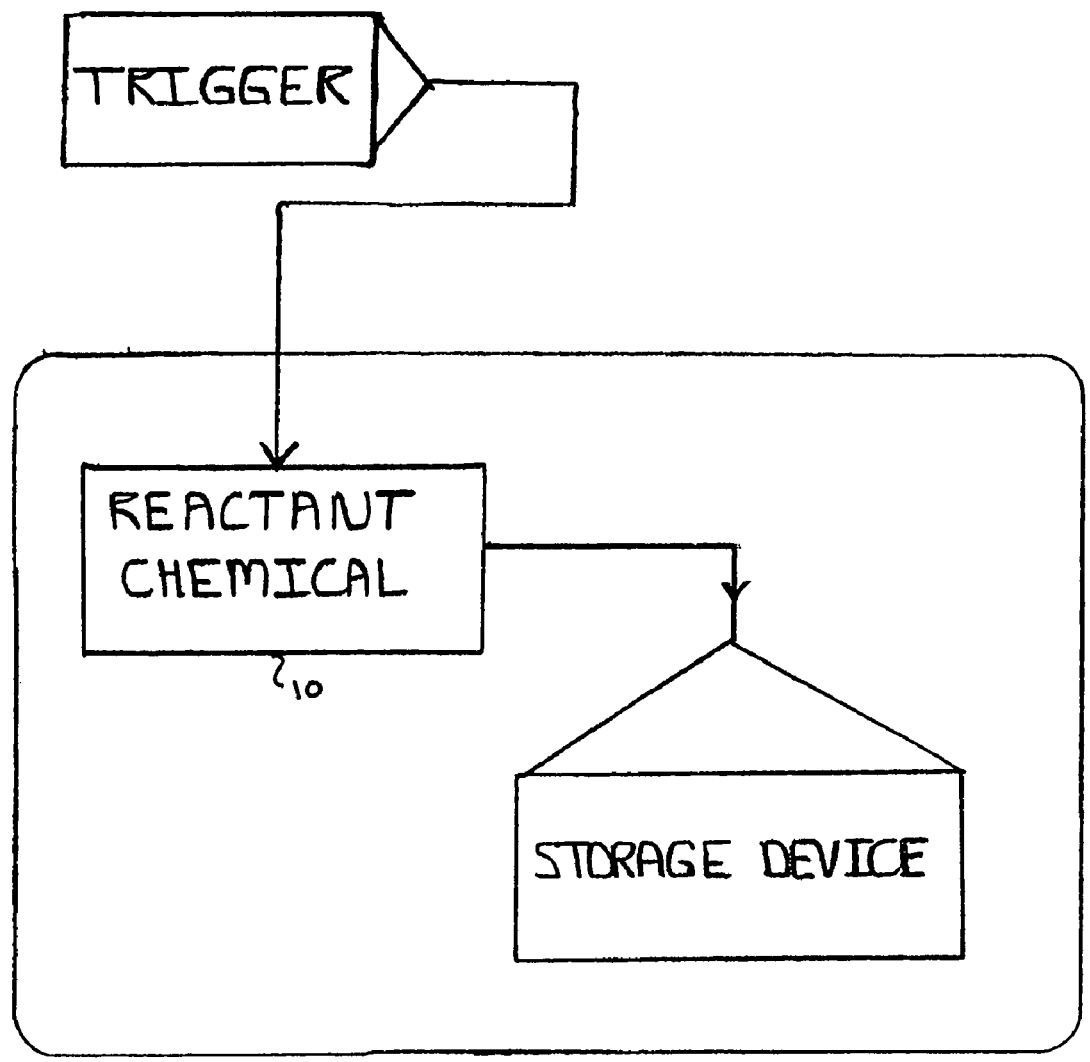
FIG. 1 is a block diagram of a device incorporating the present invention.

DOD technology works in two stages. First, a trigger is operatively connected to a reactant reservoir 18 containing a reactant chemical 10, FIG. 1. The trigger may be activated by a GPS device 48, cellular phone device 40, Internet communication 34, RF style receiver circuit 32, trip sensor 36, trip circuit 26, and/or keyboard command 38, Second and upon activation of the trigger, the reactant chemical 10 is injected into a chamber 12 of a hard drive or other data storage media containing platters 14 or other storage devices which stores the data or onto the platter(s) 14 itself. The reactant chemical 10 is dispersed in such a manner that a significant percentage of the drive surface area is coated, rendering the surface completely unrecoverable by all known technology.

Figure 2:
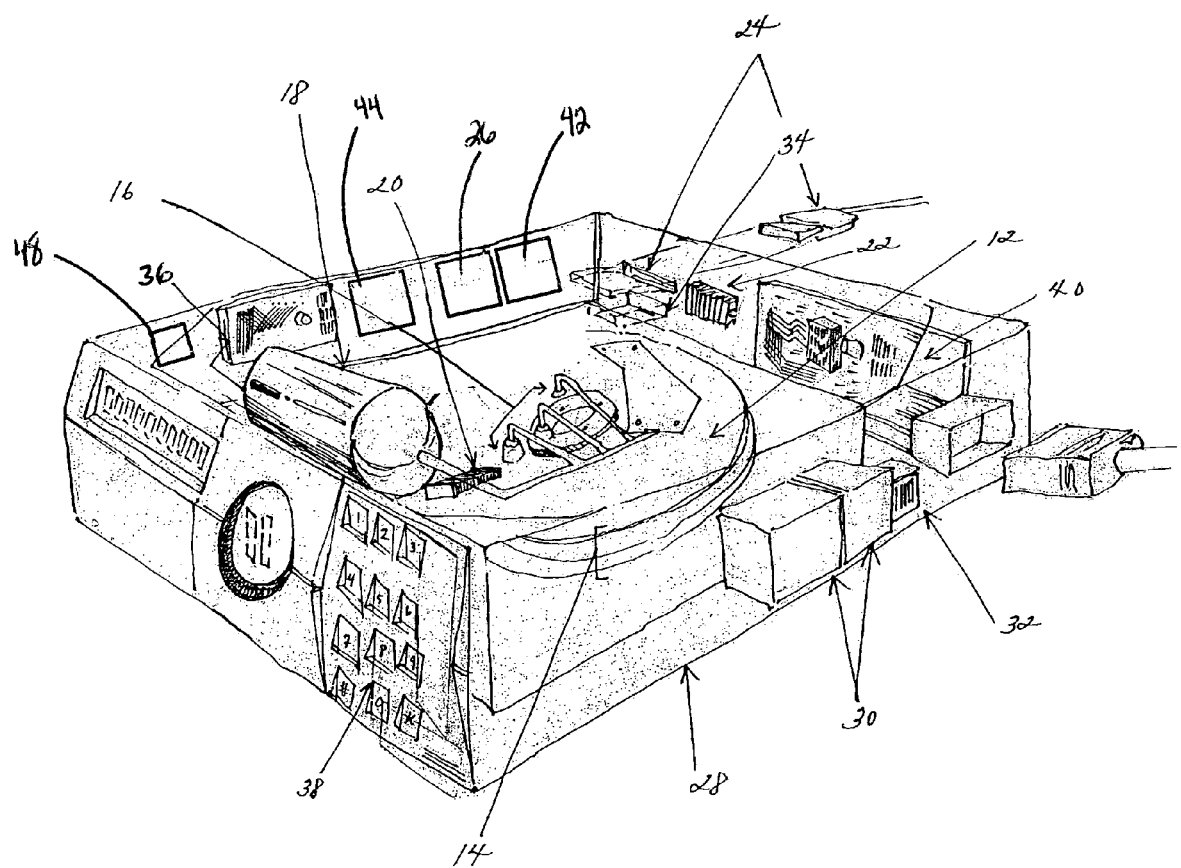
FIG. 2 is a block diagram of one type of magnetic media, a standard hard disk drive, modified with the technology and methodology according to the present invention.

In the presently known preferred embodiment, one or more nozzles 16, FIG. 2, are fluidly coupled to one or more reactant reservoirs 18 by means of chemical supply lines 44. The reactant reservoir 18 is preferably one or more pressurized canister of approximately 2–4 ounces of reactant chemical 10 having a wire melt fuse 20 or similar release device. In the presently known preferred embodiment, the reactant chemical 10 is a two part chemical that is stored in two canisters 18. Once triggered, the contents of the canister 18 are either mixed or sprayed onto the media surface where they will mix and become active. Typically, only a small quantity of the reactant chemical 10 is needed. Tests have shown that approximately 20 cc's of reactant total is enough to render a hard disk unrecoverable in 15 minutes or less. In the preferred embodiment, the reactant chemical 10 is deployed from an aerosol reservoir 18 to provide finer or smaller particles, which aids adhesion to the media surface.

After the reactant chemical 10 is applied to the data storage device, the drive or other data storage device 14 is rendered inoperable due to the viscosity of the reactant chemical 10 preventing the read/write heads from moving and/or due to the reactant chemically "melting" at least the surface of the data storage device 14. A short time later, at least one or more layers on the media itself and at least the data stored in one of the layers, typically a magnetic layer, are physically destroyed due to the chemical reaction.

Although many different reactant chemicals 10 may be used, several have been initially targeted due to their low cost, general availability, and minimal toxic nature. One reactant chemical 10 that may be used is 10% CAN+3.6% HCL (Cerium Ammonium Nitrate/Hydrochloric Acid) A desired characteristic of the reactant chemical 10 is that it should be corrosive enough in nature or designed to specifically react with and cause destruction of one or more of the various layers on the magnetic storage media. Since only s small quantity of reactant chemical 10 is needed and since the reactant chemical 10 generally will tend to become less reactive or even inert over a short period of time (approximately 8 hours or so) there is minimal danger from the reactant chemical 10 escaping from the enclosure surrounding the magnetic media.

Disk drives come in external and internal assemblies and in varying sizes, all of which can benefit from the present invention. The DOD technology of the present invention is not limited to single drive installations, or even to just hard drive devices. It may be applied to RAID devices and other large scale storage systems as well as CD-ROM storage media, including CDR and CDRW drives and CD 'jukeboxes' commonly used on large networks. The present invention can also be used with other presently known or developed in the future technology that stores data on magnetic type media. The external devices connect to a computer or storage device using standard known methods such as standard USB or FireWire port 24. SCSI interfaces are also available.

A storage media incorporating the present invention typically includes an interface 26 such as a standard PCI interface card 26 coupled to a DOD modified hard drive 28. The interface 26, in both internal and external models, includes circuitry to interface with one or more trigger or activation devices, as will be explained below, and to provide the requisite trigger signal to a stopper or valve type of device 20 opening the reactant reservoir 18. The stopper device 20 may also be a pump in larger applications of the technology. Both assemblies have the same set of standard features, and can be configured with the same optional features.

The present invention includes a built-in rechargeable backup battery 30 to invoke the destruct sequence to permanently and generally instantaneously destroy magnetic data storage media and its contained data even if the PC or other device to which it is attached is powered down. Under normal operation the unit will draw power from the bus connection 24 to the PC or other electronic device.

There are various methods for initiating the destruction of the magnetic data storage media and its contained data. A 'blue-tooth' or equivalent device and an RF style receiver circuit 32, which will correspond to a remote transmitter, may be used to initiate the process of destroying magnetic data storage media and its contained data in one embodiment. A security layer may be specified, like that used in garage doors, to prevent outside deployment.

The remote transmitter typically has a battery for transmission and typically has a range of 200 feet. The remote transmitter may have two trigger buttons that must be simultaneously depressed for a set period of time in order to initiate the process for permanently and generally instantaneously destroying magnetic data storage media and its contained data. The remote transmitter may also have a status light. When the status light is off, it indicates normal operation. When the status light is red, it indicates that the battery is low. When the status light is yellow, it indicates that one of the trigger buttons has been depressed. When the status light is green, it indicates that both trigger buttons have been depressed. The green light may flash five times after which a beep might be emitted, indicating that the drive has self-destructed.

After the process of destruction has been initiated, the process may be aborted or cancelled by, for example, releasing at least one of the two trigger buttons within five seconds of from initial depression of both buttons. A time delay may be configurable within the remote transmitter or the trigger circuit 26. Destruction in this mode is guaranteed even if PC power is off using the devices built-in power supply.

In another embodiment for initiating the process of destroying the magnetic data storage media and its contained data, the user may initiate the process by a keyboard 38. For example, the user may press a user defined code or key sequence on the keyboard 38, which invokes the trigger program. After the code or key sequence is entered by the keyboard 38, the process of destruction is initiated and a countdown begins. The user may also abort the process of destruction by pressing any key on the keyboard 38 before the counter reaches 0. The keyboard 38 must be on to initiate and abort the process.

In another embodiment for initiating the process of destroying the magnetic data storage media and its contained data, the Internet 34 is used to initiate the process provided that the unit is powered on and coupled to the Internet. This embodiment utilizes software/technology such as GoToMyPC technology, which is secure, clientless and inexpensive, and allows a remote PC or device to control the PC on which the DOD drive is installed. For this embodiment to function, the user must have an "always on" Internet 34 connection, or be connected to the Internet 34 at least at the time the destruct process is initiated. The user must have an account with GoToMyPC.com or a similar program/service (i.e. PC anywhere), which will access the DOD modified hard drive 28 via this site. This remote connection is secure. Once connected, all keystrokes are sent to the PC 22 having the DOD modified hard drive 28, thereby initiating the destruct process as previously explained with regard to the keyboard 38 embodiment.

In another embodiment for initiating the process of destroying magnetic data storage media and its contained data, a detected intrusion will initiate the process. For example, trip sensors 36 are included in the assembly provided with the present invention. When the trip sensors 36 are triggered, the process of destroying magnetic data storage media and its contained data is initiated, typically after a countdown.

The trip sensors 36 may confirm that the destruction process has been initiated by beeping. Once initiated, the destruction process can be aborted by pressing a combination of keys on the keyboard 38 before countdown reaches 0.

In another embodiment for initiating the process of destroying magnetic data storage media and its contained data, a cellular phone may be used to initiate the process. For example, a user may call a number associated with the DOD modified hard drive 28 and enter a code to initiate the process. This requires an active cell phone account. A cell phone device 40 in the DOD modified hard drive 28 will answer with a confirmation beep. The user then enters a user predefined destruct sequence. The DOD modified hard drive 28 responds to the user with a confirmation message and countdown. Pressing any key on the cell phone during the countdown will abort the destruct sequence. This option does not require the PC 22 to be powered.

In yet an additional embodiment for initiating the process of destroying magnetic data storage media and its contained data, a GPS device 48 may be provided in the device being protected. In this embodiment, the GPS device 48 may be programmed by means of the trigger interface 42 to trigger automatically if the GPS device 48 detects movement of the protected device more than a preselected number of feet/yards/meters.

The present invention may also include an on-board ROM program for controlling the trigger circuit 26 for user configuration of the device. When the trigger circuit 26 receives a trigger signal, it will start the countdown and the destruction of the data on the DOD modified hard drive 28. For example, the removal of the DOD modified hard drive 28 from the PC 22 or the primary power circuit may result in the trigger signal being sent to the trigger circuit 26. Further, the DOD modified hard drive 28 may have a motion detector operatively mounted to it and in communication with the trigger circuit 26 such that upon movement of the DOD modified hard drive 28, the trigger signal is sent to the trigger circuit 26. Another example is an infrared detector that sends the trigger signal to the trigger circuit 26 upon the detection of movement. Further, an electrical circuit may be positioned such that when access to the internal portion of the data storage device is made, the trigger signal is sent to the trigger circuit 26. In addition, a voice recognition software program may be added to the PC 22 so that voice commands may send the trigger signal to the trigger circuit 26. Configurable options include: 1) a keyboard destruct sequence and a keyboard abort sequence; 2) a cell phone destruct sequence and a cell phone abort sequence; and 3) Internet destruct sequence and abort sequence.

The on-board batteries 30 may be monitored so that the user may be informed by warning lights, beeping, messages on a pc monitor, etc. if they require replacement. The batteries 30 provide power to trigger the reactant reservoir 18 as well as power to the DOD modified hard drive 28 for a brief period during the destruct sequence.

The DOD modified hard drive 28 is a standard drive, for example, a Seagate or equivalent model. Compatibility changes to the DOD modified hard drive 28 are not required. Nothing is done that will shorten its normal life span, or prevent the user from using the drive in any normal fashion.

The DOD modified hard drive 28 would typically be purchased as a unit to be installed into or attached to a PC or other device. The disk should be installed as a secondary disk, and it is not recommended that the DOD modified hard drive 28 be the primary drive though nothing actually prevents this. Using the DOD modified hard drive 28 as a primary device may result in the loss of all licensed software applications from the drive, which will require the original licensed media to restore. By using it as a secondary disk, the DOD modified hard drive 28 can be used for direct storage of sensitive data.

The user should be certain that something copied to the DOD modified hard drive 28 is not also being stored on a non-protected drive by some utility program. The user may be well advised to use the DOD modified hard drive 28 in combination with a sanitizer and NOT with other programs, which may create copies. It is important to make sure that data placed on the DOD modified hard drive 28 is not copied elsewhere, where it cannot be permanently destroyed.

Although the present invention has been described and explained in connection with a disk drive, this is not a limitation of the present invention as the invention can be utilized in conjunction with any storage media that has a reactive surface such as magnetic media, including a tape drive or the like.

The current state of technology provides some, possibly adequate, protection of data under specific circumstances but it is clear that there are many scenarios where the current state of technology is inadequate. These are scenarios where the data to be protected has already been acquired by a person with unknown intent (stolen PC), where the possibility of a breach is considered high enough that all data should be destroyed as a preventative measure (tampering, hacking), or where the user breach of security is imminent and under duress (e.g. capture of a soldier, etc)

One object of the present invention is to render the data unrecoverable in scenarios such as these. The invention has no provision for temporary inaccessibility. Implementation of the device is considered an action of last resort, which will permanently delete the data by means of the destruction of the media of the storage device.

Operation of the invention is silent, there are no alarms or indicator lights which will indicate that the device has been triggered. The invention described herein operates independent of the host PC power supply. It is connected as a peripheral device to a host PC and has its own power supply, which in turn includes a backup battery power source so that the device has sufficient power to activate should it be removed from a main power source.

An alternate configuration of the device would include it as a standard component within a PC case, with the device operating from the PC Power Supply. However, this configuration may not support certain advanced levels of protection described herein.

The invention has several user configurable security settings, which determine the specific situations or events, which will trigger the activation device 44. The activation device 44 is coupled to the reactant reservoir 18 and causes at least a portion of the reactant chemical to flow from the reactant reservoir onto the data storage device upon determining that at least one of the specific situations or events occurred. A non-exhaustive list of the specific situations or events includes: Removal of device from host computer; Removal of device from primary power circuit; Detection of motion of the device from its resting point; Specific number of fraudulent login attempts; Response to a signal sent from an infrared controller; Response to a signal sent from a cellular telephone; Response to a signal sent by a wireless transmitter; Response to a signal sent from a wired controller (computer keyboard for example); Detection of physical tampering with the device itself (case intrusion); Response to a near complete loss of power including backup batteries when no prior signal provided; Response to a command sent through the Internet; Response to a key command sequence entered by means of a device keyboard; Response to a voice command using voice recognition; Response to recognition of a biometric signal (fingerprint); and Response to high or low ambient temperature.

The trigger interface 42 may be configured to specify which events will trigger the activation device 44. For example, the trigger interface 42 may be configured to the temperature sensor. In this configuration, the activation device 44 will only be triggered upon a temperature reading outside the temperature range set in the temperature sensor. In other examples, the trigger interface 42 may be configured to a plurality of the events listed above (e.g., GPS, biometric device, motion detector).

The device would connect to a host computer via a USB 2.0, Optical Interlink, or Firewire interface for delivery of data as well as using this connection as a monitoring link to establish that the device is properly connected for triggering purposes. Destruction of the device uses an aggressive chemical reaction caused by a mixture of chemicals, which has already been formulated and proven to produce the desired results in independent tests.

Total destruction is achieved in no more than 15 minutes. Continued exposure results in a higher degree of collateral destruction to interior components of the device.

Modifications and substitutions by one ordinary skill in the art are considered to be within the scope of the present invention.

What is claimed is:

1. A system for rendering data stored on a data storage device unrecoverable upon the occurrence of a certain event, the system comprising:

a reactant reservoir including at least one chamber for holding a reactant chemical, the reactant reservoir in fluid communication with at least an area proximate at least one surface of said data storage device;

an activation device, coupled to said reactant reservoir and responsive to at least one event, for causing at least a portion of the reactant chemical to flow from the reactant reservoir into the at least an area proximate at least one surface of said data storage device, thereby destroying the stored data, the at least one event being selected from the group consisting of removal of the data storage device from a host computer, removal of data storage device from a primary power circuit, detected movement of the data storage device from its resting point, a certain number of detected unsuccessful login attempts, an infrared signal sent from an infrared controller, a remote transmitter signal sent from a remote transmitter, a cellular signal sent from a cellular telephone, a wireless transmitter signal sent by a wireless transmitter, a keyboard signal sent from a wired controller, detected physical tampering with the data storage device, detected loss of power from the primary power circuit and backup batteries, a command sent through an Internet, a key command sequence entered from the keyboard, a voice command through a voice recognition system, a biometric signal, an incorrect biometric signal, and detected temperature outside a range of temperatures; and an event interface, coupled to said activation device, for establishing selected predetermined criteria for said at least one event, wherein the selected predetermined criteria include a countdown time before the reactant chemical flows from the reactant reservoir.

2. A method for rendering data stored on a data storage device unrecoverable upon the occurrence of a certain event, the method comprising the acts of:

providing a reactant reservoir including at least one chamber for holding a reactant chemical, the reactant reservoir in fluid communication with at least an area proximate at least one surface of said data storage device;

providing an activation device, coupled to said reactant reservoir and responsive to at least one event;

sending a signal to commence the destruction of the data contained on data storage media when at least one of a certain event occurs, the at least one certain event being selected from the group consisting of: removal of the data storage device from a host computer, removal of data storage device from a primary power circuit, detected movement of the data storage device from its resting point, a certain number of detected unsuccessful login attempts, an infrared signal sent from an infrared controller, a cellular signal sent from a cellular telephone, a wireless transmitter signal sent by a wireless transmitter, a keyboard signal sent from a wired controller, detected physical tampering with the data storage device, detected loss of power from the primary power circuit and backup batteries, a command sent through an Internet connection, a key command sequence entered from the keyboard, a voice command through a voice recognition system, a biometric signal, an incorrect biometric signal, and a detected temperature outside a range of temperatures;

receiving the signal to commence the destruction of the data contained on the data storage media;

providing an event interface, coupled to said activation device, for establishing at least selected predetermined criteria for said at least one events; and responsive to said act of receiving said signal, causing at least a portion of the reactant chemical to flow from the reactant reservoir into the at least an area proximate at least one surface of said data storage device, thereby destroying the stored data after the passage of a predetermined period of time.

3. The method for rendering data stored on a data storage device unrecoverable according to claim 2, further including the act of aborting the destruction of the data contained on the data storage media before the reactant chemical comes into contact with the storage device.

4. The method for rendering data stored on a data storage device unrecoverable according to claim 3, wherein the aborting act is performed before the expiration of the predetermined period of time.

5. A method for rendering data stored on a data storage device forensically unrecoverable, the method comprising the acts of:

providing a first reactant canister containing a first reactant chemical;

providing a second reactant canister containing a second reactant chemical;

applying the first and second reactant chemicals to at least one surface of said data storage device;

causing the first and second reactant chemicals to mix and become active for rendering data on a data storage device forensically unrecoverable; and allowing the first and second reactant chemicals to react with at least one surface of said data storage device to render any data stored on said data storage device forensically unrecoverable.

6. The method of claim 5, further comprising determining the amount of reactant chemical to apply to at least one surface of said data storage device.

7. The method of claim 5 wherein applying the reactant chemical further comprising pumping the reactant chemical onto at least one surface of said data storage device.

8. The method of claim 5, wherein said step of causing the first and second reactant chemicals to mix occurs prior to said step of applying the first and second reactant chemicals.

9. The method of claim 5, wherein said step of causing the first and second reactant chemicals to mix occurs after or concurrently with said step of applying the first and second reactant chemicals.

10. A system for rendering data stored on a data storage device unrecoverable upon the occurrence of a certain event, the system comprising:

a reactant reservoir including at least one chamber for holding a reactant chemical, the reactant reservoir in fluid communication with at least an area proximate at least one surface of said data storage device; and an activation device, coupled to said reactant reservoir and configured to receive a remote signal and, upon receiving said remote signal, to cause at least a portion of the reactant chemical to flow from the reactant reservoir into the at least an area proximate at least one surface of said data storage device, thereby destroying the stored data and further configured to receive an abort signal for preventing said reactant chemical from flowing from the reactant reservoir into the at least an area proximate at least one surface of said data storage device.

* * * * *